United States Patent [19]

Uozu et al.

[11] Patent Number: 5,287,222

[45] Date of Patent: Feb. 15, 1994

[54] GRADED INDEX TYPE PLASTIC OPTICAL TRANSMISSION MEDIUMS AND THE MANUFACTURING METHOD THEREOF

[75] Inventors: Yoshihiro Uozu; Kouzou Mise; Nobuhiko Toyoda; Yoshihiko Hoshide, all of Otake, Japan

[73] Assignee: Mitsubishi Rayon Co., Ltd., Tokyo, Japan

[21] Appl. No.: 949,479

[22] PCT Filed: Feb. 26, 1992

[86] PCT No.: PCT/JP92/00210

§ 371 Date: Oct. 23, 1992

§ 102(e) Date: Oct. 23, 1992

[87] PCT Pub. No.: WO92/15901

PCT Pub. Date: Sep. 17, 1992

[30] Foreign Application Priority Data

Mar. 1, 1991 [JP] Japan .................. 3-057672

[51] Int. Cl.[5] .............................. G02B 3/00
[52] U.S. Cl. ........................ 359/654; 359/652
[58] Field of Search ..................... 359/654, 652

[56] References Cited

U.S. PATENT DOCUMENTS

| | | | |
|---|---|---|---|
| 3,626,194 | 12/1971 | Hirano et al. | 359/654 |
| 3,827,785 | 8/1974 | Matsushita et al. | 359/654 |
| 4,215,914 | 8/1980 | Muchel et al. | 359/654 |
| 4,587,065 | 5/1986 | Kouichi et al. | |
| 4,689,000 | 8/1987 | Kouichi et al. | |

FOREIGN PATENT DOCUMENTS

| | | |
|---|---|---|
| 0130838A2 | 1/1985 | European Pat. Off. |
| 0130838B1 | 1/1985 | European Pat. Off. |
| 0130838A3 | 1/1985 | European Pat. Off. |
| 58-159506 | 9/1983 | Japan |
| 60-12509 | 1/1985 | Japan |
| 2-64131 | 3/1990 | Japan |

OTHER PUBLICATIONS

Rawson, et al., "Analysis of Refractive Index Distributions in Cylindrical Graded-Index Glass Rods (GRIN Rods) Used as Image Rays" Applied Optics, vol. 9, No. 3 Mar. 1970 p. 753.

*Primary Examiner*—Scott J. Sugarman
*Assistant Examiner*—Evelyn A. Lester
*Attorney, Agent, or Firm*—Finnegan, Henderson, Farabow, Garrett & Dunner

[57] ABSTRACT

These are graded index type optical transmission mediums with a radius ($r_o$) of 0.45±0.1 mm; they are optical transmission mediums which indicate a distribution close to the optimum quadratic curve in which the refractive index distribution in the range of a radius of at least 0.2 $r_o$ ~ 0.8 $r_o$ minimizes mode diffusion; the modulation transfer factor, which indicates the degree of resolution, is a high resolution at 60% or more; they are optical transmission mediums suitable for the transmission of images in copiers, facsimiles and image sensors; and this involves a method for manufacturing said optical transmission mediums by eliminating a fixed quantity of the periphery of the graded index type optical transmission medium preforms.

3 Claims, 5 Drawing Sheets

GRADED INDEX TYPE PLASTIC OPTICAL TRANSMISSION MEDIUMS AND THE MANUFACTURING METHOD THEREOF

TECHNICAL FIELD

This invention is related to graded index (abbreviated "GI" hereafter) type plastic optical transmission mediums and the manufacturing method thereof which can be used in a variety of optical transmission path applications such as light focussing optical fibers, light focussing long cylindrical lenses, and optical sensors; and in particular, it relates to optical transmission mediums and the manufacturing methods thereof which make it possible to transmit high resolution and high quality images with little color aberration.

BACKGROUND TECHNOLOGY

In recent years there have been many attempts to use long cylindrical optical transmission mediums as a means to transmit images for facsimiles, copiers and image sensors, etc. For such optical transmission mediums, it is desirable to have a product that can transmit high resolution and high quality images with little color aberration, and it is desirable to be able to adopt a manufacturing method for mass production which has few product quality variations among the optical transmission mediums.

With this kind of optical transmission medium for image transmission, a GI type optical transmission medium is used in which the refractive index becomes continuously smaller going from the center to the outer periphery within the cross-section of the optical transmission medium and in which there is an angled gradient in the distribution of the refractive index. This kind of GI type optical transmission medium appears in Japan Patent Publication No. Sho 47-816, Japan Patent Publication No. Sho 47-28059, and in EP Laid-Open Patent Application No. 208159, etc.

The GI type optical transmission medium indicated in Japan Patent Publication No. Sho 47-816 uses glass as the material, and because it is made by an ion exchange method, it has low productivity, and it is difficult to produce products between varying lots that provide the same shape and the same performance. In particular, with long cylindrical lenses of the same length that have a fixed total conjugate length, it is difficult to make products that provide the same performance between varying lots. As a result, the difficulties arise that the lengths of the GI type optical transmission mediums which provide the same performance are not uniform, and that handling them becomes troublesome.

The GI type plastic optical transmission mediums that are indicated in Japan Patent Publication No. Sho 47-28059 are made by dipping into a particular solvent long cylindrical shaped or fiber shaped molded products consisting of a mixture of 2 or more transparent polymers that have different refractive indices and which have different solubility in relation to said solvent, thus changing the percentage of mixture of the aforementioned 2 or more polymers going from the surface of said molding to its center. Plastic GI type optical transmission mediums can more or less be made by this method, but products that are a mixture of 2 or more polymers having different refractive indices can easily produce turbulence in the distribution of the refractive index, and it is difficult to make a product with a shape in which the refractive index distribution follows the optimum distribution curve from the core toward the outer periphery. Moreover products are made in which the transparency of the optical transmission medium is lowered, and the light scattering can easily occur. Thus, the characteristics are not sufficient as a GI type optical transmission medium, and this does not promote applications and development.

In EP Laid-Open Patent Application No. 0208159, a method is indicated in which, after molding into a rod shape a uniform mixture of at least one kind of thermoplastic polymer (A) and of monomer (B) which when polymerized is compatible with polymer (A) and which becomes a polymer with a refractive index that differs from polymer (A), and after making a continuous concentration distribution of monomer (B) going from the surface of said molded product to the center by dispersing monomer (B) from the surface of the molded product, a GI type plastic optical transmission medium made by polymerizing the unpolymerized monomer in said molded product.

Figure 2:
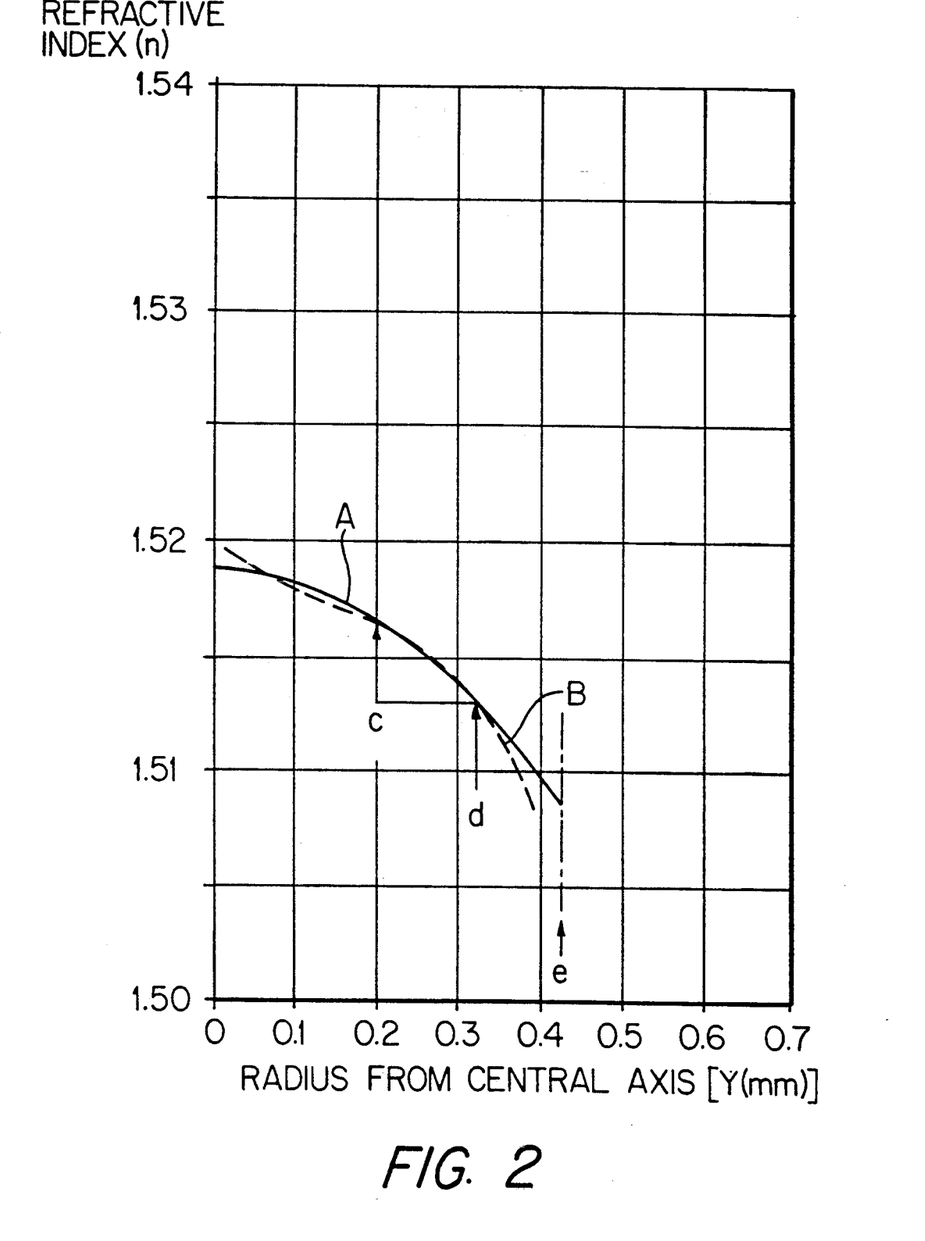
FIG. 2 is a drawing which shows the refractive index distribution of optical transmission mediums that have been conventionally developed.

The refractive index distribution curve of a GI type optical transmission medium should ideally have the quadratic distribution curve which is expressed by the following formula (3), and said curve should be like that shown by A in FIG. 2.

$$N = N_0(1 - ar^2) \quad (3)$$

In this connection, the inventors of present invention found that, when using an interfaco-interference microscope to measure GI type optical transmission mediums that were made by the above mentioned conventional methods, the refractive index distribution curve was like B in FIG. 2, and the range of $0.5\,r_0 \sim 0.75\,r_0$ radially from the core (In the same figure, this is the range of $c \sim d$; likewise, e indicates the periphery.) has a refractive index distribution curve with a shape that is rather close to the optimum curve expressed in formula (3), but the refractive index distribution further inside or outside of that greatly diverges from the optimum curve.

Figure 3A:
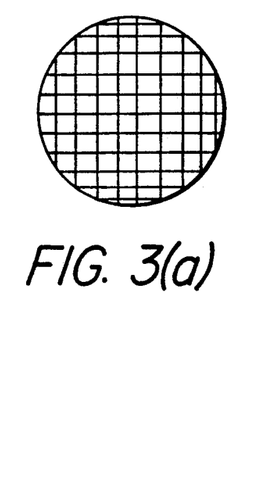
Figure 3B:
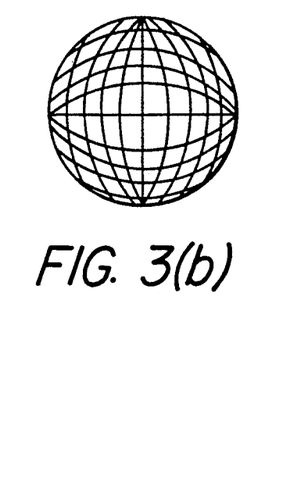
Figure 3C:
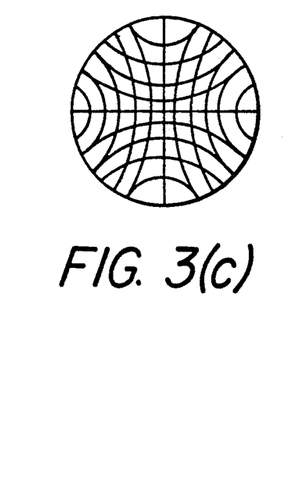
Figures 4, 6:
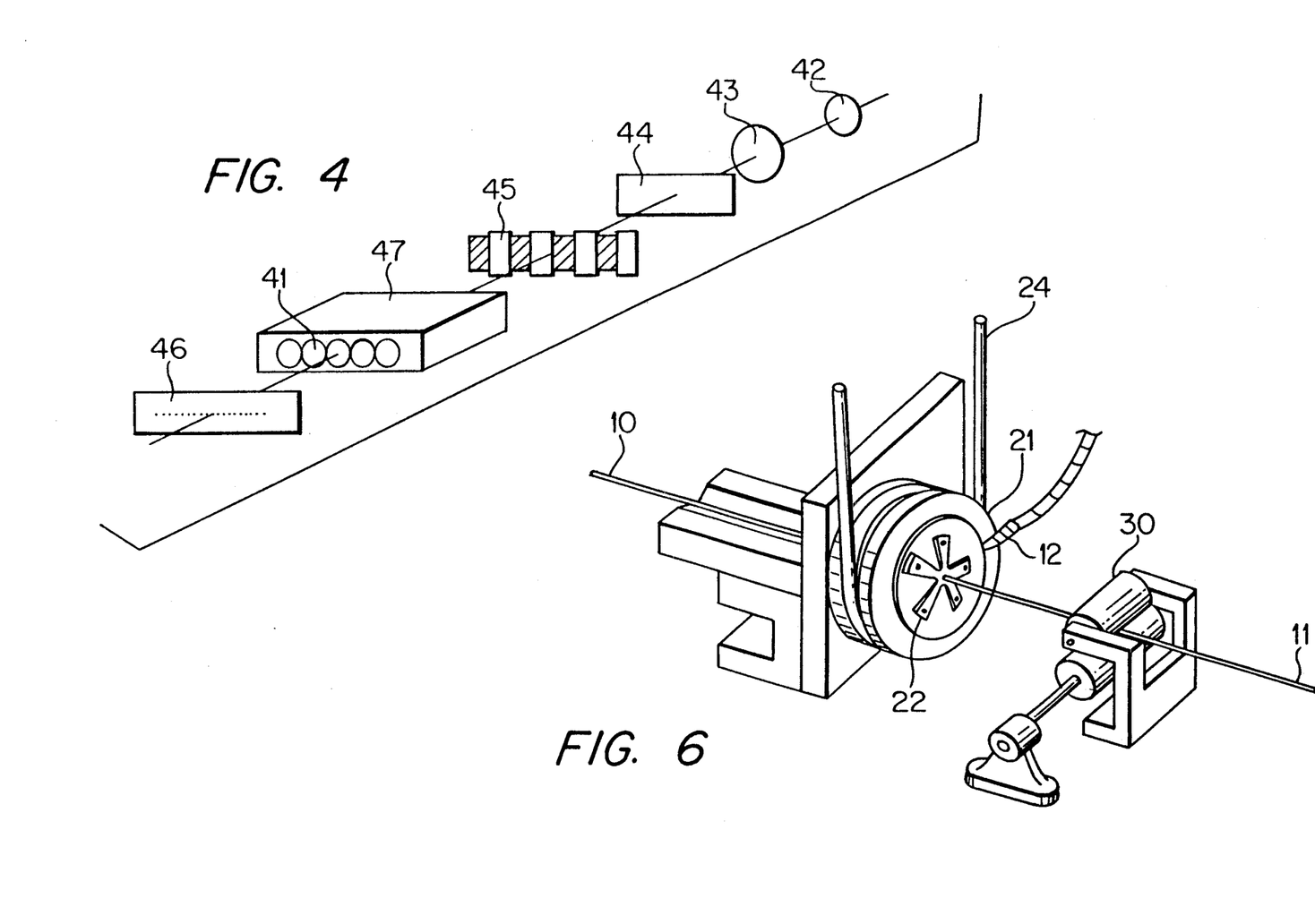
FIG. 4 is a drawing which shows the equipment which uses a CCD sensor to measure the maximum value ($i_{max}$) and the minimum value ($i_{min}$) of the amount of light that passes through during the observation of the grid image by the optical transmission medium.
FIG. 6 is a drawing which shows the cutting equipment to remove the periphery of the optical transmission medium preform used in order to produce the optical transmission medium of the present invention.
Figure 5:
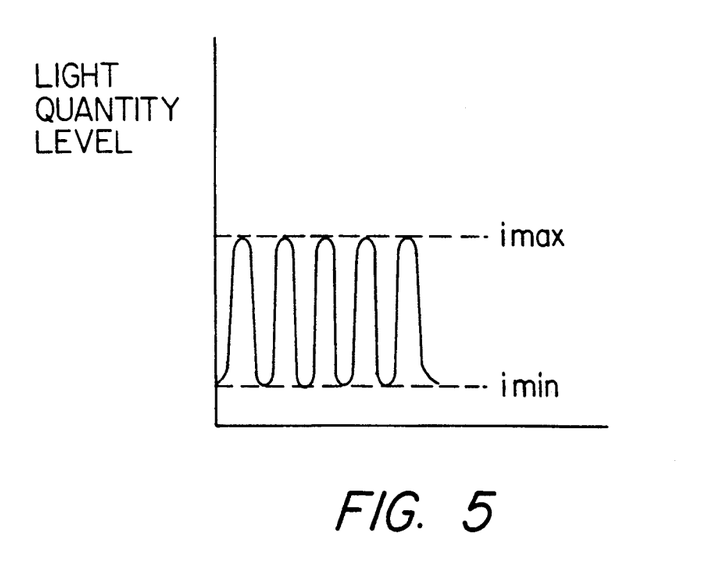
FIG. 5 is a drawing which shows the results of measuring the maximum amount of light and the minimum amount of light observed by the equipment in FIG. 4.

When observing a grid pattern using optical transmission mediums which have a refractive index distribution curve which almost perfectly follows the optimum curve stipulated in Formula (3), the regular grid image shown in FIG. 3 (a) can be obtained, but when observing a grid image using optical transmission medium in which the refractive index distribution varies from the ideal refractive index distribution as shown in FIG. 2B described above, only the greatly distorted grid images shown in FIGS. 3 (b) and (c) can be obtained, and accurate image transmission cannot be performed. The resolution of this kind of optical transmission medium can be expressed by a modulation transfer factor (abbreviated MTF hereafter). The calculation of the MTF value both of optical transmission mediums made by conventional technology and of optical transmission mediums of the present invention is as follows: first, as shown in FIG. 4, light from light source (42) is adjusted by lens (43), light which passes through grid (45) with a grid constant 4 (line pair/mm) strikes the GI type optical transmission medium (41), and the grid image that passes through this optical transmission medium is read by CCD sensor (46); the maximum value $i_{max}$ and the minimum value $i_{min}$ of this measured light quantity are measured as shown in FIG. 5; and the MTF value is calculated by Formula 4 below. Here, as shown by the grid in FIG. 4, the grid constant is a value which indicates how many line pairs, with 1 line pair being 1 group combining a white line and a black line, can fit within 1 mm, and the 4 lines/mm of this line pair is expressed as '4 line pair/mm'.

$$\text{MTF}(\%) = \{(i_{max} - i_{min})/(i_{max} + i_{min})\} \times 100 \quad (4)$$

A GI type plastic optical transmission medium which has a refractive index distribution which almost exactly conforms to the optimum curve stipulated in aforementioned Formula (3) has not yet been developed.

Prior to the present invention, the inventors conducted studies to obtain GI type plastic optical transmission mediums with a resolution high enough and a color aberration small enough to be that they could be used practically as optical transmission mediums for facsimiles and image sensors when monochromatic light source such as LED is used, and proposed in Japan Patent Application No. Hei 1-307636 a GI type plastic optical transmission medium characterized by: having a radius $r_o$ in the range of $0.5 \pm 0.1$ mm; having a refractive index distribution from the central axis portion to the peripheral surface in the range of at least $0.25 \, r_o \sim 0.70 \, r_o$ which provides a refractive index distribution close to the refractive index distribution curve stipulated in the aforementioned Formula (3); and having an MTF of 40% or more when measuring the maximum light quantity value $i_{max}$ and minimum light quantity value $i_{min}$ by passing a 4 line pair/mm grid image through said optical transmission medium and focussing the image on a CCD sensor, and then calculating the MTF by the aforementioned Formula (4).

Figure 1:
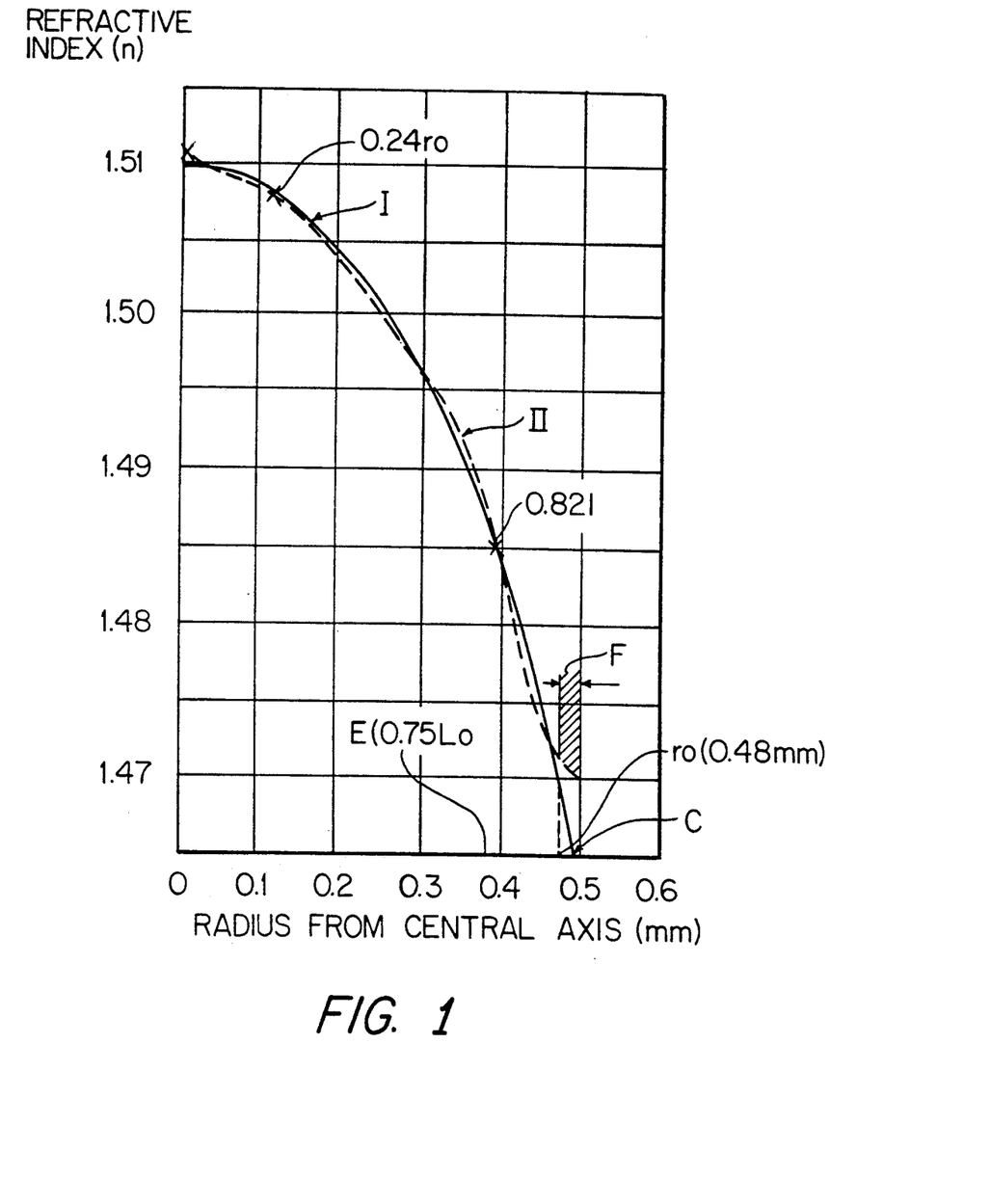
FIG. 1 is a drawing which shows the refractive index distribution of an optical transmission medium of the present invention.

In this invention, the refractive index distribution in the radial direction of the GI type optical transmission medium achieved is like that of [II] in FIG. 1; it has many portions that agree with curve [I] which follows the optimum curve of Formula (3); and when actually transmitting images by this optical transmission medium, the performance was remarkably improved compared to the characteristics of the image transmissions of plastic optical transmission mediums that were developed conventionally.

However, when taking $r_o$ to be the radius from the center of the optical transmission medium, the refractive index of the peripheral portion outer than $0.70 \, r_o$ of the GI type optical transmission medium diverged greatly from the optimum curve of Formula (3), and the peripheral area of the images transmitted by this kind of optical transmission medium had distortions and weakness and could not be said to be satisfactory as an optical transmission medium for image transmission of high resolution images. In order to eliminate this kind of fault, we studied methods to blacken the outer periphery area from $0.70 \, r_o$, but when that effect was obtained, the problem arose that the image transmission effectiveness of the optical transmission medium as a whole was reduced by the darkening for that portion only, and this could not be considered adequate.

SUMMARY OF THE INVENTION

Then, the inventors perfected the present invention by discovering that a GI type plastic optical transmission medium preform which provides a refractive index distribution like that in [I] of FIG. 1 could be made, and that, when eliminating region F of C~D from the area of C~E in FIG. 1, a GI type optical transmission medium that makes remarkable improvements in the previously described difficult points could be obtained.

The gist of the present invention resides in a GI type plastic optical transmission medium which has a circular cross-section with a radius $r_o$ in the range of $0.45 \pm 0.1$ mm, and it is characterized by the fact that the refractive index distribution in the range of at least $0.25 \, r_o \sim 0.8 \, r_o$, and preferably $0.25 \, r_o \sim 0.85 \, r_o$ going from the central axis portion of said optical transmission medium to the peripheral surface provides a refractive index distribution which is very close to the refractive index distribution curve stipulated in Formula (1) below.

$$n(r) = n_0 \{1 - (g^2/2)r^2\} \quad (1)$$

(In the above described formula, $n_0$ is the refractive index of the central axis portion of said optical transmission medium, and is an optional value in the range of $1.5 \pm 0.1$; $n(r)$ indicates the refractive index of the portion positioned at a distance r in the direction of the outer periphery from the central axis portion of said optical transmission medium; g indicates the refractive index distribution constant of said optical transmission medium and is a value of $0.3 \sim 0.7$; and r indicates the distance in the peripheral direction from the central axis portion of said optical transmission medium.)

Furthermore, the manufacturing process of the above mentioned GI type plastic optical transmission medium is characterized by the elimination of the periphery of the optical transmission medium preform in which the refractive index distribution in the range of at least $0.25 \, L_o \sim 0.70 \, L_o$ from the central axis portion to the peripheral surface of the GI type plastic optical transmission medium preform, which has a circular cross-section in which the radius $L_o$ is in the range of $0.5 \pm 0.1$ mm, provides a refractive index distribution that is close to the refractive index distribution curve stipulated in Formula (2) below.

$$n(L) = N_0 \{1 - (g^2/2)L^2\} \quad (2)$$

(In the formula above, $N_o$ is the refractive index of the central axis portion of said optical transmission medium preform, and is an optional value in the range of $1.5 \pm 0.1$; $n(L)$ indicates the refractive index of the portion positioned at a distance L in the direction of the periphery from the central axis portion of said optical transmission medium preform; g indicates the refractive index distribution constant of said optical transmission medium preform, and is a value of $0.3 \sim 0.7$; and L indicates the distance in the peripheral direction from the central axis portion of said optical transmission medium).

Because the refractive index distribution in the range of at least $0.25 \, r_o \sim 0.8 \, r_o$, and preferably $0.25 \, r_o \sim 0.85 \, r_o$ from its central axis portion to the peripheral surface, provides a refractive index distribution that is close to the optimum curve of the refractive index distribution stipulated in above mentioned Formula (1), the GI type optical transmission mediums of the present invention: can provide characteristics which have an MTF of 60% or more when measuring the maximum light quantity $i_{max}$ and the minimum light quantity $i_{min}$ by passing a 4 line pair/mm grid image through said optical transmission mediums, focussing the image on a CCD line sensor, and calculating the MTF by above mentioned Formula (4); can provide better quality image transmission compared to conventionally developed GI optical transmission mediums; and in particular, are optical transmission mediums superior in not having image distortions in the peripheral portion.

Because it has a circular cross-section in which the radius $r_o$ is in the range of $0.45\pm0.1$ mm, the optical transmission mediums of the present invention can have an optimum distribution for the refractive index distribution in the range of at least $r=0.25\ r_o\sim0.8\ r_o$. When the radius $r_o$ is larger than the above mentioned range, it becomes difficult to satisfy Formula (1) in the range of $0.25\ r_o\sim0.8\ r_o$. On the other hand, when radius $r°$ does not meet the above mentioned lower limit, the handling properties are weakened.

With the present invention, "is close to" the optimum refractive index distribution curve means that within the stipulated range, the refractive index is in a range of $\pm0.0001$ from the optimum curve.

In Formula (1) mentioned above, when the refractive index $n_o$ of the central axis portion is outside the range stipulated above, it becomes difficult to have an MTF of 60% or more. Also, when the refractive index distribution constant g is greater than the range stipulated above, the total conjugate length becomes too short, and it becomes to difficult to set the distance for operation. In contrast, when g is too small, it becomes difficult to make small scale facsimiles and image sensors which incorporate optical transmission mediums because the total conjugate length becomes too long.

Below, we will further explain both the GI optical transmission mediums of the present invention and the manufacturing method for the GI optical transmission mediums of the present invention.

Optical transmission mediums of the present invention are obtained by producing an optical transmission medium preform that provides the specified performance, and then eliminating the outer peripheral portion of that preform by, for example, physically stripping it off.

This preform can be obtained by: preparing 3 or more kinds of unhardened liquid substances which have mutually different refractive indices after hardening and which have a viscosity of $10^3\sim10^8$ poise in the unhardened state; taking these unhardened liquid substances in the order of the successively decreasing refractive index going from the center to the outer surface and layering them in a concentric circular shape by, for example, supplying them to a multilayer composite spinning nozzle and forming them into an unhardened state strand fiber; making the refractive index and thickness of each layer of the preform after hardening to agree with the aforementioned Formula (2) when the central position of each layer at the time it is made into a strand fiber is plotted with the distance from the central axis of the strand fiber being the horizontal axis, and the refractive index of each layer being the vertical axis; and then, while performing mutual diffusion processing of the substances in adjacent layers so as to make the refractive index distribution between each layer of this strand fiber become a continuous refractive index distribution, or after having performed such mutual diffusion processing, hardening the unhardened strand fiber.

When only 2 kinds of unhardened liquid substances which mutually vary in refractive indices are used, it is difficult to make a refractive index distribution in the range of $0.25\ L_o\sim0.70\ L_o$ from the center of the preform to resemble the quadratic curve of Formula (2). Consequently, it is preferable that there be 3 or more kinds of unhardened substances which mutually differ in refractive indices. In contrast, if there are too many kinds, it becomes difficult to adjust the refractive index distribution. As a result, $3\sim7$ kinds are more preferable, with $3\sim5$ kinds being most desirable.

It is preferable that the viscosity of the unhardened liquid substances which are used in the present invention all be in the range $10^3\sim10^8$ poise. When the viscosity is less than $10^3$ poise, then too many of the threads break during formation, and the molding of the thread-like products tends to become difficult. When the viscosity is greater than $10^8$ poise: the operability during formation becomes unsuitable; it becomes difficult to distribute each layer in a concentric shape; and the molded product can easily develop unevenness in diameter.

The unhardened liquid substances which are used in the present invention are substances that can be hardened, specifically, polymerized and crosslinked, and radical polymerizable vinyl monomers or compositions made from said monomers and polymers soluble in said monomers can be used.

Specific examples of radical polymerizable vinyl monomers that can be used include methyl methacrylate ($n=1.49$), styrene ($n=1.59$), chlorostyrene ($n=1.61$), vinyl acetate ($n=1.47$), fluoroalkyl (meth)acrylate ($n=1.37\sim1.44$) such as 2,2,3,3-tetrafluoropropyl (meth)acrylate, 2,2,3,3,4,4,5,5-octafluoropentyl (meth)acrylate, 2,2,3,4,4,4-hexafluorobutyl (meth)acrylate, 2,2,2-trifluoroethyl (meth)acrylate, (meth)acrylates with refractive indices of $1.43\sim1.62$ such as ethyl (meth)acrylate, phenyl (meth)acrylate, benzyl (meth)acrylate, hydroxyalkyl (meth)acrylate, alkylene glycol di(meth)acrylate, trimethylolpropane di(meth)acrylate, trimethylolpropane tri(meth)acrylate, pentaerythritol di-, tri- or tetra(meth)acrylate, diglycerine tetra(meth)acrylate, dipentaerythritol hexa(meth)acrylate as well as diethylene glycol bis(allyl carbonate), fluoroalkylene glycol poly(meth)acrylate, etc.

In order to adjust the viscosity of these unhardened liquid substances and to make a refractive index distribution from the center portion to the periphery of the strand fiber-shaped molded product obtained, it is preferable that the above mentioned unhardened substances be composed of the kind of vinyl monomers described above and of polymers soluble in said vinyl monomers. The polymers used here need to have good mutual solubility with the polymers made from the previously described radical polymerizable vinyl monomers, and examples of this kind of polymers include poly(methyl methacrylate) ($n=1.49$), poly(methyl methacrylate)-based copolymers ($n=1.047\sim1.50$), poly(4-methylpentene-1) ($n=1.46$), ethylene/vinyl acetate copolymer ($n=1.46\sim1.50$), polycarbonate ($n=1.50\sim1.57$), poly(vinylidene fluoride) ($n=1.42$), vinylidene fluoride/tetrafluoroethylene copolymer ($n=1.42\sim1.46$), vinylidene fluoride/tetrafluoro-ethylene/hexafluoropropylene copolymer ($n=1.40\sim1.46$), polyfluoroalkyl (meth)acrylate polymers, etc.

In order to adjust the viscosity, it is preferable that a polymer which has the same refractive index be used in each layer because this makes it easier to obtain a plastic optical transmission medium which has a continuous refractive index distribution from the center to the surface. In particular, poly(methyl methacrylate) is excellent in transparency, and because its own refractive index is high, it is very suitable as a polymer to be used when making the GI optical transmission mediums of the present invention.

To harden the strand fibers that are made up of the aforementioned unhardened substances, it is preferable to add a thermoset catalyst and/or a photoset catalyst to the unhardened substance. That is, the strand fibers that contain a thermoset catalyst and/or a photoset catalyst are heat processed or irradiated with light, preferably, irradiated with ultraviolet radiation from the surrounding.

Common peroxide-based catalysts can be used as the thermoset catalyst. Examples of photoset catalysts include benzophenone, benzoin alkyl ether, 4'-isopropyl-2-hydroxy-2-methyl-propiophenone, 1-hydroxycyclohexyl phenyl ketone, benzyl methyl ketal, 2,2-diethoxyacetophenone, chlorothioxanthone, thioxanthone-based compounds, benzophenone-based compounds, ethyl 4-dimethylaminobenzoate, isoamyl 4-dimethylaminobenzoate, N-methyldiethanolamine, and triethylamine, etc.

Examples of light sources which can be used in photopolymerization include sources which generate light with a wave length of 150~600 nm such as: carbon arc lamps, high-pressure mercury lamps, ultrahigh pressure mercury lamps, low-pressure mercury lamps, chemical lamps, xenon lamps and lasers.

The radius of the optical transmission medium preform rod must be in the range of $0.5 \pm 0.1$ mm, and when the radius is larger than this range, it is difficult to have a product with a refractive index distribution which is close to the highest form indicated by Formula (2) in the range of $0.25 L_o \sim 0.70 L_o$ of the preformed rod, and it becomes difficult to take this as the preform for manufacturing the high resolution GI type optical transmission medium which are the intention of the present invention.

In manufacturing the preformed rod, a product can be made in which the refractive index of the preformed rod is in the range of $0.25 L_o \sim 0.70 L_o$ and which resembles the quadratic form in Formula (2) by making the appropriate combination of: the composition (the monomer/polymer ratio, the refractive index, etc.) of unhardened substances; the discharge percentage for each layer; the discharge nozzle temperature; the temperature and the time during mutual diffusion; and the photoset or thermoset (polymerization) conditions, etc.

Methods for eliminating the external part of this optical transmission medium preform include: (1) A method in which the periphery of the optical transmission medium preform is swollen by a solvent, and the swollen portion is scraped off by passing the preform in that state through a hole which has an aperture of the appropriate dimension; (2) A method in which the outer periphery of the optical transmission medium preform is shaved off by blades; (3) A method in which the optical transmission medium preform is immersed in an alkali solution, etc. and the outer portion is dissolved and removed.

Method (1), in which the optical transmission medium preform is swollen by a solvent, is a method in which, after causing the plastic optical transmission medium preform to swell in the specified area by soaking it in a solvent which has the capability dissolving that plastic, it is passed through a circular hole of the specified diameter, and the swollen portion is scraped away. It is possible to adjust the width scraped off by the kind of solvent used, by the time of immersion in the solvent, by the swelling temperature, and by the dimensions of the circular holes.

Solvents that can dissolve the plastic used in the optical transmission medium preforms can include chloroform, methylene chloride, carbon tetrachloride, methyl ethyl ketone, acetone, and ethyl acetate, etc.

Method (2) in which the outer peripheral portion of the optical transmission medium preform is shaved off by blades can be performed by, for example, the method indicated in the oblique-view drawing of the cutter in FIG. 6. In the same figure, (10) is the optical transmission medium preform, and (11) is the GI type optical transmission medium of the present invention which is provided with the high resolution properties. Cutting tooth (22) may be a single unit or a combination of many units may be used; by combining multiple units of cutting teeth to revolving piece (21), the periphery of the optical transmission medium preform which passes through the central hole of piece (21) which is rotated by drive source (24) can be effectively cut without producing unnecessary grooves on the preform.

(12) is an equipment to blow cutting oil to prevent poor cutting of the preform due to heat generated when cutting optical transmission medium preform (10). (30) is a nip roller for the purpose of drawing the GI type optical transmission mediums of the present invention, and the speed for cutting the preform can be regulated by adjusting the rotational speed of the revolving tooth (22) and the drawing speed of nip roller (30).

BRIEF EXPLANATION OF THE DRAWINGS

FIG. 3 consists of drawings which show the grid images which have been observed by the optical transmission mediums, and among these, (a) is the grid image observed by using an optical transmission medium in which the refractive index distribution is close to the quadratic curve stipulated by Formula (3), and (b) and (c) are grid images observed by using optical transmission mediums in which their respective refractive index distributions diverge from the ideal refractive index distribution.

DESCRIPTION OF THE PREFERRED EMBODIMENTS

Below, we will describe the present invention in concrete terms using examples. Also, in each of the working examples below, a composite spinning nozzle is used in which the width of the nozzle for each layer is designed so that the refractive index of the multiple kinds of unhardened liquid substances which are hardened decrease successively in order from the center portion, and so that the refractive index after hardening each layer and the thickness of the layer are made to follow the quadratic curve indicated in aforementioned Formula (2) when the central position of each layer at the time it is made into a strand fiber is plotted with the distance from the central axis portion of the strand fiber being the horizontal axis, and the refractive index of each layer being the vertical axis.

EXAMPLE 1

Forty six parts by weight of poly(methyl methacrylate) ($[\eta]=0.56$, measured at 25° C. in methyl ethyl ketone (MEK)), 44 parts by weight of benzyl methacrylate, 10 parts by weight of methyl methacrylate, 0.2 part by weight of 1-hydroxycyclohexyl phenyl ketone and 0.1 part by weight of hydroquinone were made into the unhardened liquid substance for formation of the first layer (central part) by heating and mixing at 70° C.

Fifty parts by weight of poly(methyl methacrylate) ($[\eta]=0.41$, measured at 25° C. in MEK), 50 parts by weight of methyl methacrylate, 0.2 part by weight of 1-hydroxycyclohexyl phenyl ketone, and 0.1 part by weight of hydroquinone were made into the unhardened liquid substance for formation of the second layer by heating and mixing at 70° C; and 45 parts by weight of poly(methyl methacrylate) ($[\eta]=0.34$, measured at 25° C. in MEK), 35 parts by weight of 2,2,3,3,4,4,5,5-octafluoropentyl methacrylate, 20 parts by weight of methyl methacrylate, 0.2 part by weight of 1-hydroxycyclohexyl phenyl ketone and 0.1 part by weight of hydroquinone were made into the unhardened liquid substance for formation of the third layer by heating and mixing at 70° C.

The above mentioned 3 kinds of unhardened liquid substances were simultaneously extruded and made into a strand fiber using molding equipment that was equipped with a true conjugate type 3 layer composite spinning nozzle. The viscosity at the time of extrusion was $4.5\times10^4$ poise for the substance of the first layer, $2.0\times10^4$ poise for the second layer, and $2.2\times10^4$ poise for the third layer. Moreover, the temperature of the composite spinning nozzle was 55° C. Next, after performing mutual diffusion processing between all the layers by passing the strand fiber by 90 cm through a tube under a nitrogen atmosphere, the strand fiber was run through the center of an irradiation unit in which twelve 40 W fluorescent lamps with a length of 120 cm were arranged in an evenly spaced circle, and the optical transmission medium preform with a radius ($L_o$) of 0.50 mm was drawn by a nip roller at a speed of 50 cm/minute. The discharge volume ratio was first layer: second layer: third layer=1:1:1. The refractive index distribution for the central portion was 1.512, and for the periphery was 1.470; the refractive index distribution constant (g) was 0.52,; and it had a refractive index curve which resembles the quadratic curve [I] that satisfies Formula (2) in the range of 0.25 $L_o \sim 0.75 L_o$ going from the center to the outer surface as shown by [II] in FIG. 1.

Both ends of the above mentioned optical transmission medium preform were polished; it was made in lenses with a length of 7.2 mm; the MTF measured using a grid of 4 line pair/mm was 57%; and the total conjugate length at that time was 15.4 mm. The focussed image obtained of the grid was a clear image with little distortion, but distortion was found in the peripheral area. Several of these optical transmission medium preforms were combined into an optical transmission medium array of lenses 7.1 mm in length that had a structure like that shown in 47 of FIG. 4, and the MTF of this optical transmission medium array measured using the 4 line pair/mm grid was 49% with a total conjugate length of 15.4 mm.

The above mentioned optical transmission medium preform was immersed in chloroform kept at 10° C. for 45 seconds; it was passed through a small hole opened in a silicone rubber sheet having a thickness of 1 mm and the portion swollen by the chloroform (the F portion in FIG. 1) was scraped off; and an optical transmission medium with a radius ($r_o$) of 0.48 mm was obtained. The refractive index distribution of this optical transmission medium was 1.512 for the central axis portion ($n_o$) as shown by I in FIG. 1, and 1.474 for the peripheral portion; the refractive index distribution constant (g) was 0.52; and as shown by II in FIG. 1, the range of 0.24 $r_o \sim 0.82\ r_o$ going from the central portion to the outer had a refractive index distribution very close to the quadratic curve I which satisfies Formula (1).

Both ends of the above mentioned optical transmission medium were polished; it was made in lenses with a length of 7.2 mm; the MTF measured using a grid of 4 line pair/mm was 65%; and the total conjugate length at that time was 15.4 mm. Also, the focussed image obtained of the grid was a clear image with extremely little distortion even in the periphery when compared to the optical transmission medium preform prior to scraping the surface.

Several of these optical transmission medium were combined into an optical transmission medium array of lenses 7.2 mm in length that had a structure like that shown in 47 of FIG. 4, and the MTF of this optical transmission medium array measured using the 4 line pair/mm grid was 56% with a total conjugate length of 15.4 mm. Taking LEDs as a light source for this optical transmission array, an image scanner combined with a CCD as a light receiving element was assembled. This image scanner had very high resolution, and it could transmit clear images.

EXAMPLE 2

The liquid substance used for the first layer in Example 1 was used as the first layer. 50 parts by weight of poly(methyl methacrylate) ($[\eta]=0.40$, in MEK, measured at 25° C.), 20 parts by weight of methyl methacrylate, 30 parts by weight of benzyl methacrylate, 0.2 parts by weight of 1-hydroxycyclohexyl phenyl ketone, and 0.1 part by weight of hydroquinone were heated and mixed at 65° C., and used as the liquid substance for forming the second layer. The liquid substance used for the second layer in Example 1 was used as the third layer. Further, 50 parts by weight of poly(methyl methacrylate) ($[\eta]=0.40$, in MEK, measured at 25° C.), 30 parts by weight of methyl methacrylate, 20 parts by weight of 2,2,3,3-tetrafluoropropyl methacrylate, 0.2 part by weight of 1-hydroxycyclohexyl phenyl ketone, and 0.1 part by weight of hydroquinone were heated and mixed at 65° C., and used as the liquid substance for forming the fourth layer.

The aforementioned 4 kinds of liquid substances were simultaneously extruded as in Example 1 using a concentric, circular, 4 layer composite nozzle, and made into a strand fiber. At the time of extrusion, the viscosity of the liquid substance of the first layer was $4.5\times10^4$ poise; that of the liquid substance of the second layer was $4.0\times10^4$ poise; that of the third layer, $2.0\times10^4$ poise; and that of the fourth layer, $2.2 \times 10^4$ poise. The temperature of the composite nozzle was 60° C.

Figure 7:
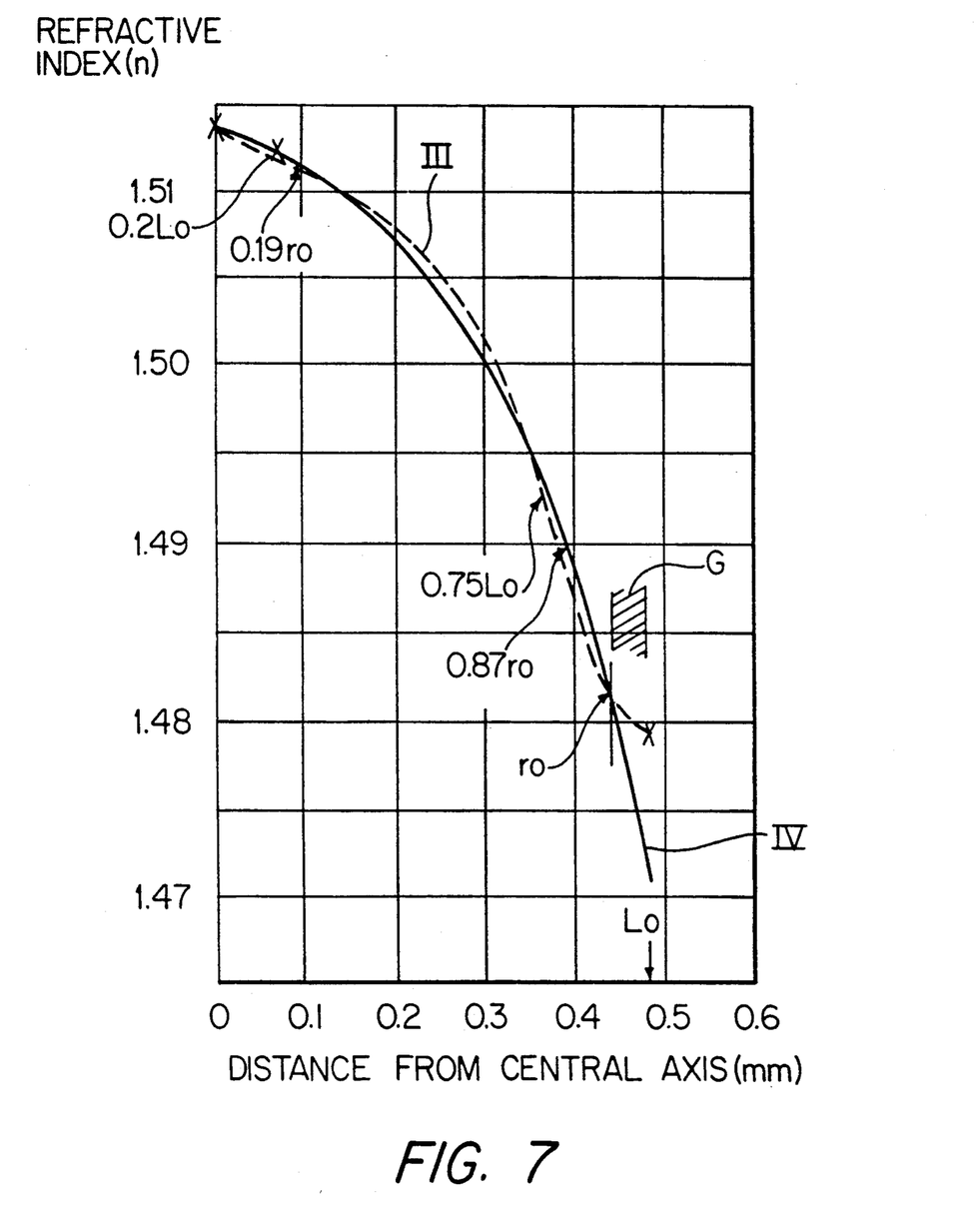
FIG. 7 is a drawing which shows the refractive index distribution of the optical transmission medium of the present invention.

Next, it was hardened in the same manner as that in Example 1, and an optical transmission medium preform with a radius ($L_o$) of 0.48 mm was obtained. The discharge ratio was (first layer): (second layer): (third layer): (fourth layer)=2:1:1:1; the optical transmission medium preform obtained was measured by an interfaco-interference microscope, and the refractive index distribution for the central axis portion ($N_o$) was 1.513, and for the periphery, 1.479; the refractive index distribution constant (g) was 0.53; and, as shown by III in FIG. 7, it had a refractive index distribution close to quadratic curve IV indicated by Formula (2) in the range of $0.2\ L_o \sim 0.75\ L_o$ going from the center to the peripheral surface. Moreover, with a lens length of 7.1 mm and a total conjugate length of 14.9 mm, the MTF measured using a 4 line pair/mm grid was 57%.

Furthermore, combining several of these optical transmission medium preforms and making them into an optical transmission medium array as in Example 1 resulted in an MTF of 53%.

The above mentioned optical transmission medium preform was soaked for 45 seconds in chloroform kept at 12.5° C.; the swollen part by the chloroform (part G in FIG. 7) was scraped off by passing it through a small hole opened in a sheet of silicone rubber having a thickness of 1 mm thick; and an optical transmission medium with a radius ($r_o$) of 0.445 mm was obtained. The refractive index distribution of this optical transmission medium was 1.512 for the central axis portion ($n_o$), and 1.481 for the periphery; the refractive index distribution constant (g) was 0.53; and the range of $0.19\ r_o \sim 0.87\ r_o$ going from the center to the peripheral surface had refractive index distribution that was close to the optimum curve which satisfies Formula (1).

Both ends of the above mentioned optical transmission medium were polished and made into lenses with a length of 7.1 mm; the MTF measured using a 4 line pair/mm grid was 71%; and the total conjugate length at the time was 14.9 mm. Moreover, compared to the optical transmission medium preform prior to scraping the surface, the focussed image obtained of the grid was a clear image with extremely little distortion even in the periphery.

Several of these optical transmission mediums were combined into an optical transmission medium array of lenses 7.1 mm in length that had a structure like that shown in 47 of FIG. 4, and the MTF of this optical transmission medium array measured using the 4 line pair/mm grid was 63% with a total conjugate length of 14.9 mm. Taking LEDs as a light source for this optical transmission medium array, an image scanner combined with a CCD as a light receiving element was assembled. This image scanner had very high resolution, and it could transmit clear images.

EXAMPLE 3

Using the liquid substances used in Example 2 for molding layers 1 to 4 respectively as well as taking the substance used to form the third layer in Example 1 to be the liquid substance for forming the fifth layer, these liquid substances for each layer were supplied to a five layer concentric, circular, composite nozzle, were extruded, and were made into a strand fiber; an optical transmission medium preform was obtained by hardening.

The discharge ratio was (first layer): (second layer): (third layer): (fourth layer): (fifth layer)=3:1:1:1:2; the optical transmission medium preform obtained was measured by an interfaco-interference microscope, and the refractive index distribution for the central axis portion ($N_o$) was 1.514, and for the periphery, 1.469; the refractive index distribution constant (g) was 0.57; and it had a refractive index distribution close to quadratic curve indicated by Formula (2) in the range of $0.15\ L_o \sim 0.79\ L_o$ going from the center to the peripheral surface. Moreover, with a lens length of 8.0 mm and a total conjugate length of 15.9 mm, the MTF measured using a 4 line pair/mm grid was 59%. Furthermore, the MTF of an optical transmission medium array made using this optical transmission medium preform in the same manner as in Example 1 was 57% (measured by a 4 line pair/mm grid).

Using water resistant sandpaper (#2000) on the above mentioned optical transmission medium preform, the outer surface was removed, and an optical transmission medium with a radius ($r_o$) of 0.44 mm was obtained. The refractive index distribution of this optical transmission medium was 1.514 for the central axis portion ($n_o$), and 1.472 for the periphery; the refractive index constant (g) was 0.57; it had a refractive index distribution close to the optimum curve indicated in Formula (1) in the range of $0.13\ L_o \sim 0.89\ L_o$ going from the center to the peripheral surface; and the MTF, measured in the same manner as in Example 1, was 75% with a lens length of 8.0 mm and a total conjugate length of 15.9 mm. Furthermore, the MTF of an optical transmission medium array made using this optical transmission medium in the same manner as in Example 1 was 71% (measured with a 4 line pair/mm grid); and the image scanner which used this array could transmit extremely high resolution images.

Possibilities for Industrial Applications

Because they are products in which the refractive index distribution in the range of at least $0.25\ r_o \sim 0.80\ r_o$ from the center is extremely close to the distribution curve indicated in Formula (1), the GI type plastic optical transmission mediums of the present invention can transmit good quality images with few image distortions in the periphery, and thus they are products that are extremely useful as optical transmission mediums for copiers, facsimiles and LED printers which require high resolution in particular.

We claim:

1. Graded index type optical transmission mediums characterized by being optical transmission mediums which have a circular cross section with a radius $r_o$ in the range of $0.45 \pm 0.1$ mm, and characterized by a refractive index distribution in the range of at least $0.25\ r_o \sim 0.85\ r_o$ going from a central axis portion to a peripheral surface of said optical transmission medium that provides a refractive index distribution close to the refractive index distribution curve stipulated in Formula (1) below:

$$n(r) = n_o\{1 - (g^2/2)r^2\}, \quad (1)$$

wherein the above described formula, $n_o$ is the refractive index of the central axis portion of said optical transmission medium, and has an approximate value in the range of $1.5 \pm 0.1$; $n(r)$ indicates the refractive index of the portion positioned at a distance r in the direction of the outer periphery from the central axis portion of said optical transmission medium; g indicates the refractive index distribution constant of said optical transmission medium and is a value of 0.3~0.7; and r indicates the distance in the peripheral direction from the central axis portion of said optical transmission medium.

2. Graded index type plastic optical transmission mediums as claimed in claim 1, characterized by a refractive index distribution in the range of at least 0.25 $r_o$~0.8 $r_o$ going from the central axis portion to the peripheral surface of said optical transmission mediums that provides a refractive index distribution close to the refractive index distribution curve stipulated by the above mentioned Formula (1).

3. A manufacturing method for the graded index type plastic optical transmission mediums as claimed in claim 1, characterized by having graded index plastic optical transmission medium preforms which have a circular cross-section with a radius in the range of 0.5±0.1 mm, and characterized by eliminating a outer periphery of the optical transmission medium preforms in which a refractive index distribution in the range of at least 0.25 $L_o$~0.70 $L_o$ going from a central axis portion to a peripheral surface of said optical transmission medium preforms provides a refractive index distribution close to the refractive index distribution curve stipulated in Formula (2) below:

$$n(L) = N_o\{1-(g^2/2)L^2\}, \quad (2)$$

wherein the formula above, $N_o$ is the refractive index of the central axis portion of said optical transmission medium preform, and has an approximate value in the range of 1.5±0.1; n(L) indicates the refractive index of the portion positioned at a distance L in the direction of the outer periphery from the central axis portion of said optical transmission medium preform; g indicates the refractive index distribution constant of said optical transmission medium preform, and is a value of 0.3~0.7; and L indicates the distance in the peripheral direction from the central axis portion of said optical transmission medium.

* * * * *